Jan. 14, 1930.　　F. L. MORSE　　1,743,157
DRIVE CHAIN
Filed May 23, 1928　　3 Sheets-Sheet 1
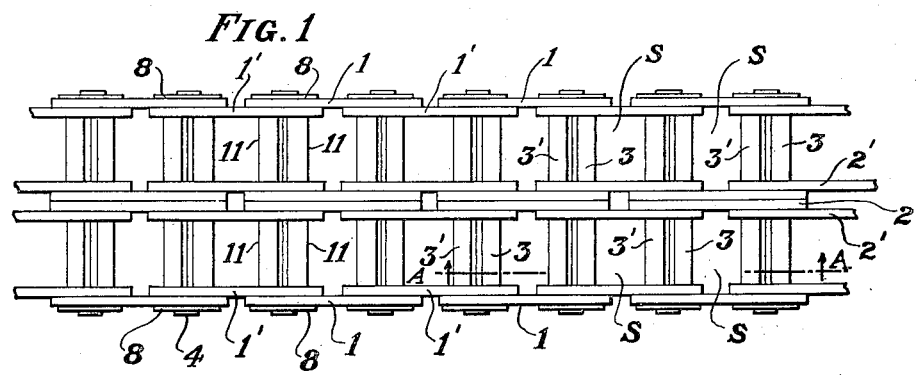
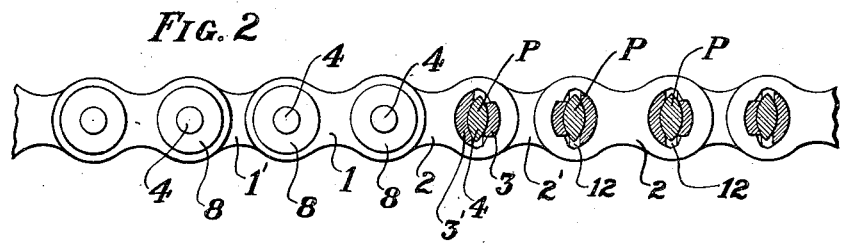
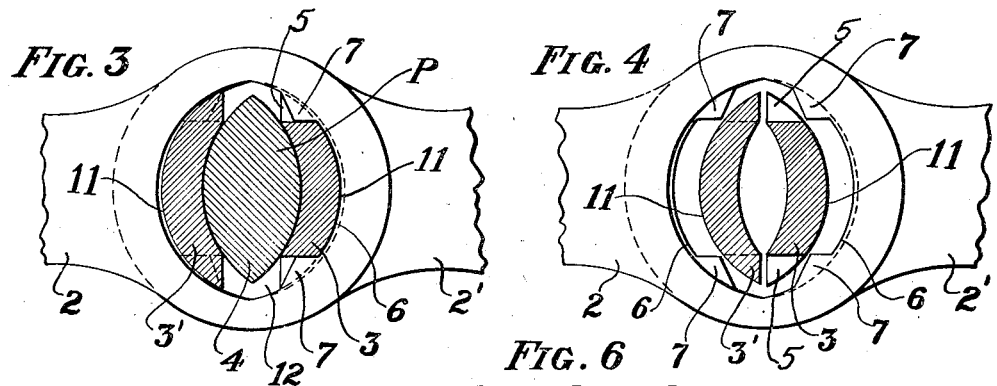
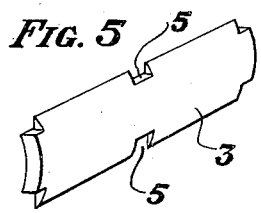
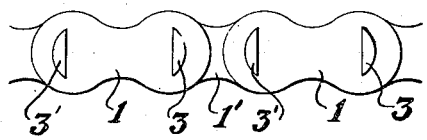
FRANK L. MORSE INVENTOR.
BY
*Symmestvedt + Lechner*
ATTORNEYS

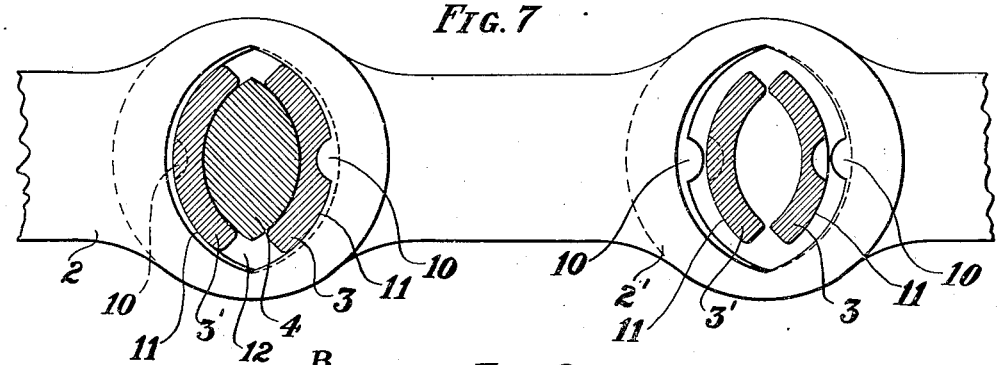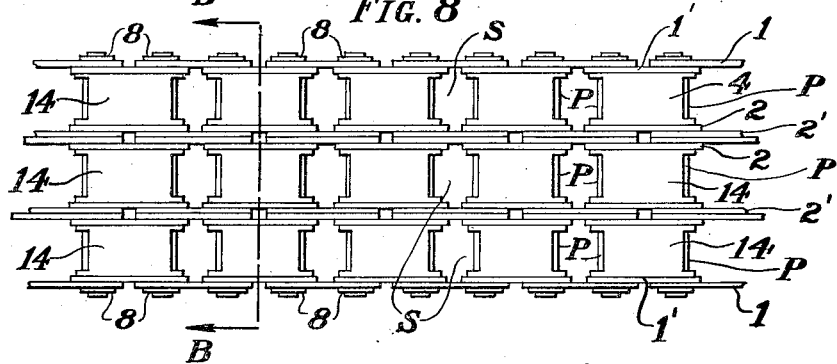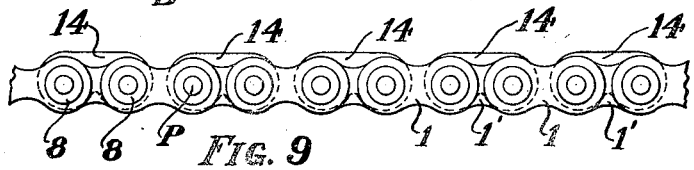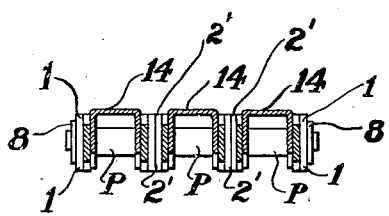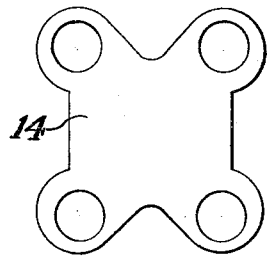
FRANK L. MORSE INVENTOR.

Jan. 14, 1930.  F. L. MORSE  1,743,157
DRIVE CHAIN
Filed May 23, 1928  3 Sheets-Sheet 3

FRANK L. MORSE INVENTOR.

BY

Synnestvedt + Lechner
ATTORNEYS.

Patented Jan. 14, 1930

1,743,157

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

DRIVE CHAIN

Application filed May 23, 1928. Serial No. 279,908.

This invention relates to chains used in the transmission of power, and particularly to chains of the multi-strand type. One object of the invention is to simplify and improve the construction of such chains so as to make them better adapted for quiet running at high speeds; another object is to more effectively distribute the metal so as to obtain relatively long life without excessive weight or centrifugal effect. Other objects are to improve the lubrication, facilitate the manufacturing and assembling operations, improve the bearing and wearing surfaces, and to obtain other advantages as will become apparent as the description proceeds.

How the foregoing objects and advantages are obtained will be clear from the following description when considered in connection with the accompanying drawings which illustrate the preferred and modified embodiments of the invention.

In the drawings:

Fig. 1 is a plan view of a multi-strand chain illustrating one form of the invention.

Fig. 2 is a side elevation of the chain shown in Fig. 1, partly in elevation and partly in section along the line A—A of Fig. 1.

Fig. 3 is an enlarged detail view in cross section of one form of joint showing one method of locking or keying the link plates to the segmental bushings.

Fig. 4 is a view similar to Fig. 3 but with the central pintle part removed, showing how the link plates may be slid on to the side pintale parts and assembled in place.

Fig. 5 is a perspective view of the side pintle parts showing the locking notches or keyways used in Figs. 3 and 4.

Fig. 6 shows another method of securing the pintles.

Fig. 7 shows another form of locking notch or key.

Fig. 8 is a plan view of a multi-strand chain having a modified form of spacing means.

Fig. 9 is a side elevation of the chain shown in Fig. 8.

Fig. 10 is a transverse cross-section on the line B—B of Fig. 8, showing the shape of the spacer in greater detail.

Fig. 11 is a development view of the spacer of Fig. 10 showing it as a stamping before being bent into shape.

Figure 12:
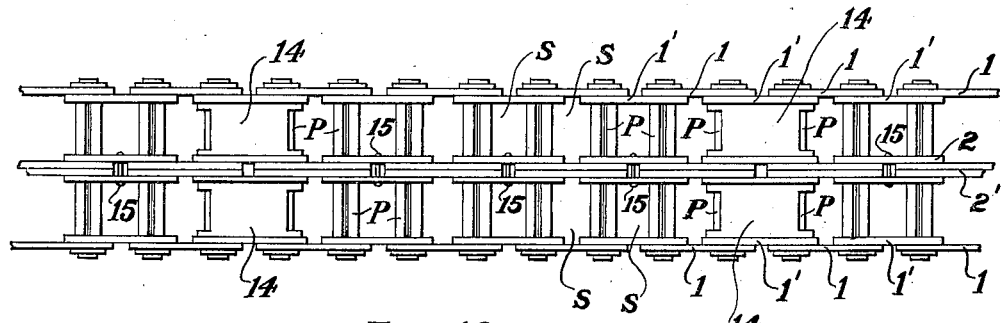
Fig. 12 is a plan view on a smaller scale showing the spacing means located at intervals of several links apart, to lighten the chain and control its balance or vibration point.

The chains of the multi-strand type have been developed for service where something stronger than the ordinary single strand block or roller chain was desired, and yet not so heavy as the silent or toothed link type of chain. In a characteristic form such as shown in Fig. 1, they are of a relatively open construction having spaces $s$, $s$, into which the sprocket teeth can project when running. Since the strands of links must be spaced apart to provide these openings, and it is not generally feasible to rivet the inside links to the pins to hold the strands in place, various special problems have arisen in relation to the construction and operation of these chains.

In chains of this general type of which I am aware, cylindrical bushings have been employed as the link spacing and sprocket engaging elements, but it has been found that these tend to wear rapidly, particularly at high speeds.

In the present invention I aim to provide a multi-strand chain having better bearing surfaces and lubrication, and the bearing or wearing parts are arranged so as to be strong, durable, and to have no projecting parts liable to break off under the shocks of running—with the various features combined so as to permit economical manufacture.

Referring now to Figs. 1 and 2, the multi-strand chain there shown by way of example is of the two strand type, though it will be understood that the chains may be built with any desired number of strands using the same construction, by merely adding to the number of inside strands. In the form shown in Fig. 1 the outside strands are composed of overlapping single link plates 1, 1', and the inside strands are composed of overlapping double link plates 2, 2'. The number and thickness of the overlapping link plates may vary in different installations according to the pull which the chain is designed to carry, for example, for heavier pulls the outer strands might have two link plates overlapping two, and the inner strands six link plates wide with three interspersed overlapping three, or any other suitable arrangement, but usually the strands are kept relatively narrow, as the lightness of the chain is one of its chief advantages.

In the form shown in Figs. 1 to 5 inclusive, the pintles indicated in general by the reference letter $p$ are made in three parts, a segmental bushing or bearing part 3 which is keyed to one set of links, another segmental bushing or bearing part 3' which is keyed to the next set of links, and a lozenge shaped floater or central pintle pin 4 having broad arcuate bearing surfaces upon which the segmental bearing parts 3 and 3' may turn.

One manner of keying the bushings or bearing parts 3 and 3' to their respective link plates is shown in detail in Fig. 3, Fig. 4 and Fig. 5, as well as in the right hand cross-sectional portion of Fig. 2. The segmental bushings or bearing parts 3 and 3' are notched as at 5, 5, wherever it is desired to locate the inner strands of the chain (see Fig. 5), the number of these notches or groups of notches 5 depending on the number of strands of chain desired.

The link plates 2, 2' are punched with corresponding holes having sockets 6 to receive the reduced portions of the bushings 3, 3', and are also provided with keys or projecting portions 7 which fit against the upper and lower faces of the bushings, 3, 3' at the notches 5 and hold them against rotational motion in the link plate heads when the chain is in operation.

The method of assembly can be seen from Figs. 3 and 4. In Fig. 4 the central pintle pin 4 is not in place, and it will be noted that the link plates 2, 2' can be slid over the segmental bushings 3, 3' until opposite the notches 5 and then pulled back into the sockets 6. The central pintle pin 4 can then be inserted between the bushings 3, 3', thus locking the link plates 2, 2' and bushings 3, 3' in place—the link plates being held against transverse displacement by the ends of the bushings projecting beyond the notches.

Various methods may be employed for securing the outside pintle plates to the appropriate pintle parts, these outside link plates 1, 1' being accessible for riveting, welding, etc., in the same manner as in the ordinary single strand chain. In the case of the chain shown in Figs. 1 to 5 inclusive, the central pintle member 4 is brought out through a washer 8 and riveted thereto. The washer 8 covers the ends of the bearing bushings 3, 3' and is free to move and turn independently of the link plates 1, 1' so that the pintle pin 4 may freely adjust itself to the bushings 3, 3' when the chain is in operation.

Another method for securing the outside link plates 1, 1' is shown in Fig. 6, in which the segmental bushing 3 or 3' corresponding to the outside link plate 1 or 1' is brought out through the link plate and riveted thereto, the rest of the link plate being solid so as to cover the ends of the other pintle parts and retain them in place. In this case the outside link plate, being keyed to the segmental bushing, turns with it just as do the inner link plates 2, 2' etc.

Another form of key for securing the inside links 2, 2' in place is shown in Fig. 7, in which the right hand joint has the central pintle member 4 removed in order to show the method of assembly (corresponding to Fig. 4) and the left hand joint shows the complete assembly with the key portions 10 fitting into the segmental bushings 3 and 3', and the central pintle member 4 holding them in place. The keying elements 10 are here located at the middle of the bushings, instead of at the ends as in Figs. 3 and 4. The general function and method of assembly is the same as described in connection with Figs. 3 and 4.

Figure 13:
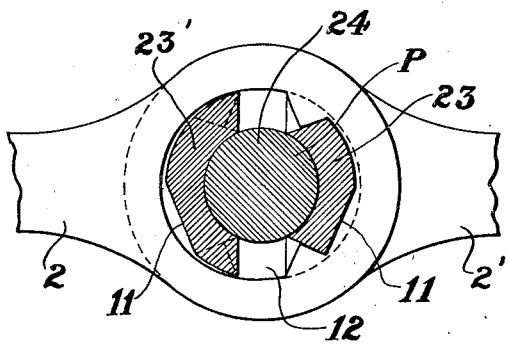
Fig. 13 is a cross-sectional view showing a modified form of joint having a round pin.

The segmental bushings 3, 3' have a double function. In addition to forming the internal bearing surface and taking the wear and movement of the joint in the articulation of the chain, they also are used as the sprocket engaging memebers, and come in direct contact with the teeth of the sprocket wheels when in operation. It will be noted that these bushings 3, 3' are shaped so that the link plates 2, 2' can be slipped over them to permit the assembly of multi-strand chains. There are no projecting portions on the bushings 3, 3' to interfere with assembly or to break off through impact with sprocket teeth. The outer face 11 of the segmental bushings 3, 3' is given any suitable conformation to engage the teeth of the sprocket wheels, depending on the type of sprocket wheels employed— and may either have a curved shape as shown, for example, in Fig. 3, or a straight face as shown, for example, in Figs. 13, 14 and 15. The shape of this outer bearing face 11 depends merely on the sprocket wheels, and not on the form of internal joint used, so that the straight face, or any other well known form, might be used with the joint shown in Fig. 3, or the curved face might be used in Fig. 13, etc., as will be obvious to those skilled in the art.

It is desirable that the centrifugal effects be reduced as much as possible, and it is also desirable to have the chain as light as possible for a given strength. In the construction described where the sprocket tooth bears directly on the outer side 11 of the segmental bushings 3, 3' the driving forces are transmitted directly through the bushings 3, 3' by the shortest path to the bearing faces of the central pintle member 4, without any cantilever action, thus combining maximum strength, minimum weight, and a direct and substantially balanced action on the wearing faces.

It will be noted that since the pintle parts 3, 3' and 4 are exposed, the pintle parts are well adapted to receive the utmost benefit from the ample lubrication in which such chains usually run. Not only can the oil freely reach the pintles, but the oil that is caught in the mouth or gap 12 between the inside edges of the bushings 3, 3' is thrown by centrifugal force outward over the bearing surfaces on each side of the central pintle pin 4 under conditions most favorable for the lubrication of the wearing surfaces.

The advantages described can also be obtained without notching or keying the pintle bushings 3, 3' by using an external form of spacing means, of which one example is shown in Figs. 8, 9, 10 and 11. The spacers 14 may be made of light stampings, such as shown in development in Fig. 11, and bent into a channel or U shape and slipped over the pintles as shown in cross-section in Fig. 10, so as to space the inner strands of links 2, 2' as desired. Where these are used on each set of links the general appearance is as shown in Figs. 8 and 9, and the spacers 14 have the added function of serving, to some extent, to retain or delay the oil in passing through the chain under centrifugal force. If desired these spacers 14 can be extended to practically cover the back of the chain.

It is not necessary, however, to employ spacers such as 14, notches 5, or any other form of spacing device, at every successive link of the chain. In some cases it is desirable to put spacers at regular or irregular spaced intervals along the chain, as shown, for example, in Fig. 12, depending on the guiding of one link by the next to maintain the intervening links properly spaced. Where necessary the intervening link plates can be held together by short transverse tie pins 15. The use of spacers located at intervals of several links has several advantages; it makes a lighter chain than the construction shown in Fig. 8 for example; and in some cases, by locating the spacers 14 either at regular or irregular intervals the natural vibration period of the chain may be altered and whipping controlled.

Figure 14:
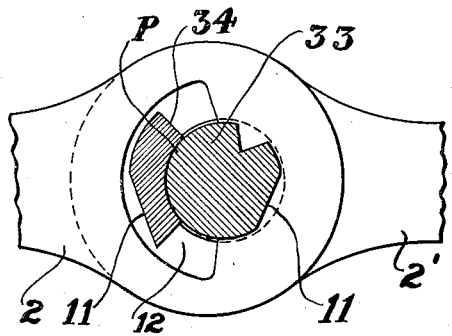
Fig. 14 is a cross-sectional view showing a modification having a two-part frictional joint.

In the form of joint illustrated in Fig. 3, for example, the bearing or wearing surfaces of the pintle 4 and segmental bushings 3, 3' are broader and of flatter curvature than if a cylindrical or round pintle had been used. This gives a less concentration of bearing pressure and a more effective wearing surface. The present invention, however, is applicable to any form of split joint, whether of two, three or more parts. For example, in Fig. 13 a round or cylindrical central pintle part 24 is used, and the segmental bushings 23 and 23' are correspondingly shaped, and the articulation or turning action occurs about the geometrical center of the pintle 24. In other respects the action is the same as with the pintles hereinbefore described, with the sprocket teeth engaging directly against the segmental bushings 23, 23', and the lubrication occurring through the gap between them. Similarly, the chain may be provided with two part joints, of which an example is shown in Fig. 14. Here one part 33 of the pintle is keyed to one set of link plates and the other part 34 is keyed to the adjoining set of link plates, with the part 33 turning within the part 34 as the chain bends.

Figure 15:
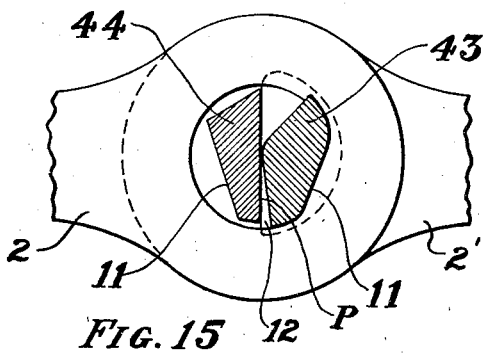
Fig. 15 is a cross-sectional view of a modification having an anti-friction or rocker joint.

Another form of two part pintle is shown in Fig. 15, in which the joint is of the antifriction or rocker type, with one part 43 keyed to one set of link plates, the other part 44 keyed to the adjoining set, and the two pintle parts 43 and 44 rocking or rolling on each other when the chain bends. In general any form of split joint may be used which is so formed as to permit multiple strand assembly and which has its outer or split parts adapted to engage directly against the sprocket teeth so as to transmit a direct and balanced pressure to the pintle bearing surfaces without cantilever action. By joints of the split type I mean those made of two or more parts arranged so that oil moving transversely to the line of pull may work in between them, and related so that while one part is held stationary against the sprocket tooth, the other part may turn or rock in relation to it. Segmental bush joints and rocker joints are common examples of the split type, as distinguished from the cylindrical bushing and roller bushing types, in which the part engaged by the sprocket tooth extends all around the joint.

The word "silent" has acquired a particular meaning and connotation when used in relation to the structure of chains, as will be understood by those skilled in the chain art. The old roller and stud type chains, such as the ordinary bicycle chain, caught on the tooth and then rolled to the bottom or root of the tooth when driving, and when the chain lengthened by wear, all the driving strain came on a single tooth, resulting in a jerky drive which became noisy. In the so-called "silent chains" the sprocket teeth are formed so that the links settle into place on the sides of the teeth, and as the chain wears and the pitch increases the chain rides higher and higher on the tooth where the pitch length is greater, so that the pitch of the chain always fits the pitch of the sprocket teeth. Since the silent chain always fits the wheel, the driving strain is distributed over a number of teeth. The driving faces are usually substantially straight or wedge shaped, though any configuration that is adapted to creep outward toward the tips of the teeth, as the pitch lengthens, instead of inward toward the root, constitutes the "silent" type of construction.

Figures 16, 17:
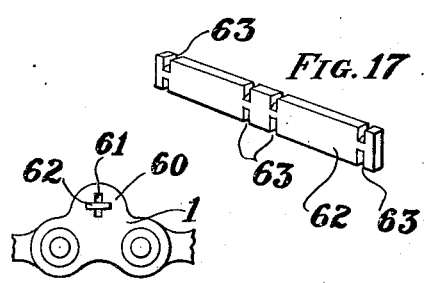
Fig. 16 is an elevation of another form of spacing means.
Fig. 17 is a detail of the spacing bar of Fig. 16.

In Figs. 16 and 17 a modified form of crossbar spacing means is illustrated, extending from one side to the other of the chain, through projections 60 on the side plates 1 having keying holes 61 through which the spacers 62 may be passed, and then turned at right angles to lock or be riveted. The notches 63 key into the plates 1, 2, etc., and space them as desired.

While I have in the foregoing illustrated my invention in certain preferred constructions, it will be understood that these are merely by way of example, and that the invention is susceptible to various modifications and adaptations as will be apparent to those skilled in the art without departing from the scope of the invention as defined in the following claims.

I claim:—

1. In a multi-strand chain adapted to run on a sprocket wheel, the combination of overlapping link plates arranged in outer and inner strands, pintle parts of the split joint type arranged so that one part of the joint may engage directly with the sprocket wheel while the other part moves relative thereto, and spacing means adapted to maintain the strands definitely spaced.

2. In a drive chain for sprocket wheels, the combination of overlapping link plates arranged in outer and inner strands, pintles extending through and exposed between said strands for engagement by the sprocket wheels, said pintles being composed of two or more members one of which is adapted to engage directly with the sprocket wheel while the other moves relative thereto, the boundary between said members opening transversely to the line of pull, and spacing means adapted to maintain the strands definitely spaced.

3. In a drive chain for sprocket wheels, the combination of overlapping link plates arranged in outer and inner strands and having holes through which pintle parts may be passed, pintles made in two or more parts and adapted to be passed through the holes in the inner strands in assembling, the boundary between said pintle parts opening transversely to the line of pull so as to allow lubricating oil to flow centrifugally therebetween, one of said pintle parts being adapted to engage directly with the sprocket wheel while the remainder of the pintle moves relative thereto, and spacing means adapted to maintain the strands definitely spaced.

4. In a drive chain for sprocket wheels, the combination of overlapping link plates arranged in outer and inner strands and having holes through which pintle parts may be passed, pintles of the split type opening transversely to the line of pull and extending exposed between the strands of links so that they may be directly engaged by the sprocket, and spacing means arranged to maintain the strands definitely spaced.

5. In a sprocket chain, the combination of overlapping links providing more than two link strands transversely of the chain, pintle parts adapted to directly engage and to be directly engaged by the sprocket teeth intermediate the strands, the links of the intermediate strand or strands having holes permitting of the assembly of the chain by first passing the said links lengthwise over said pintle parts after which the links of the other strands may be positioned, and means for spacing the strands transversely of the chain.

6. In a drive chain for sprocket wheels, the combination of link plates arranged in outer and inner strands with spaces in between into which sprocket teeth may project, pintle parts extending through the inner to the outer strands and exposed between strands so that pintle parts may engage directly against sprocket teeth, and spacing means adapted to hold the strands definitely spaced from each other.

7. In a drive chain for sprocket wheels, the combination of separate strands of link plates arranged in outer and inner strands, pintles extending through the inner strands to the outer strands and adapted to engage the sprocket teeth, and spacing means out of contact with the said teeth and adapted to maintain the strands in spaced relation.

8. In a drive chain for sprocket wheels, the combination of overlapping link plates arranged in separate spaced multiple strands, including two outer strands and one or more inner strands, spacing means arranged to maintain the strands in definite spaced relation, and pintle parts extending through the strands and exposed between strands to form engaging surfaces for the sprocket teeth.

9. In a drive chain for sprocket wheels, the combination of pintles composed of parts having driving surfaces adapted to directly engage the sprocket wheels and cooperating pintle parts adapted to move relative thereto with meeting surfaces opening transverse to the line of pull to permit centrifugal lubrication, separate multiple strands of link plates on said pintles, the strands being spaced to expose the driving surfaces of the pintles, and means for maintaining the strands in spaced relation.

10. A drive chain for sprocket wheels comprising, in combination, a plurality of strands of link plates including end strands and at least one intermediate strand, pintles for joining the link plates of said strands, and means for maintaining said strands in fixed spaced relation on the pintles transversely of the chain, said pintles being adapted to directly engage and be engaged by the teeth of a sprocket wheel at the portions thereof lying between the strands of link plates.

In witness whereof I have hereunto set my hand this 18th day of May, 1928.

FRANK L. MORSE.